(12) United States Patent
Jin

(10) Patent No.: US 7,204,268 B2
(45) Date of Patent: Apr. 17, 2007

(54) INTERNAL PRESSURE EQUILIBRIUM DEVICE FOR AIRTIGHT SPACE

(75) Inventor: Jong Sam Jin, Incheon (KR)

(73) Assignee: Busung Co., Ltd., Incheon (KR)

( * ) Notice: Subject to any disclaimer, the term of this patent is extended or adjusted under 35 U.S.C. 154(b) by 253 days.

(21) Appl. No.: 11/053,866

(22) Filed: Feb. 10, 2005

(65) Prior Publication Data

US 2006/0174947 A1 Aug. 10, 2006

(51) Int. Cl.
*F16K 17/194* (2006.01)

(52) U.S. Cl. .............................. 137/493.9; 137/533.19

(58) Field of Classification Search ............ 137/493.8, 137/493.9, 526, 533.19
See application file for complete search history.

(56) References Cited

U.S. PATENT DOCUMENTS

| 2,879,786 | A | * | 3/1959 | La Delle Heideman | 137/493.9 |
| 5,273,068 | A | * | 12/1993 | Duren | 137/526 |
| 5,623,958 | A | * | 4/1997 | Bumpers | 137/493.9 |

* cited by examiner

*Primary Examiner*—Stephen M. Hepperle
(74) *Attorney, Agent, or Firm*—Bacon & Thomas, PLLC

(57) ABSTRACT

The invention relates to an internal pressure equilibrium adjustment device for airtight space with rapid operation and simple structure.

The invention comprises of a pipe 8 which is mounted on the wall 9 of airtight space and has a plurality of holes 81 at the periphery, a case 7 which surrounds the external periphery of the pipe 8 and has a plurality of holes 71 on the wall, a first port 3 which is formed at one end of the case 7, a first ring 4 which is provided above the first port 3, a second port 5 which is formed at the partition wall 12 of the case 7, and a second ring 6 which is provided above the second port 5.

2 Claims, 3 Drawing Sheets

INTERNAL PRESSURE EQUILIBRIUM DEVICE FOR AIRTIGHT SPACE

FIELD OF THE INVENTION

The invention relates to an internal pressure equilibrium device, and more particularly, relates to an internal pressure equilibrium device for airtight space wherein pressure equilibrium operation may be performed rapidly and the structure is simple so that the manufacture cost may be saved.

BACKGROUND OF THE INVENTION

In case of the place which has airtight space like as a refrigerator or a freezing warehouse, the internal pressure of airtight space is different from the external pressure and there are many cases that the door of airtight space may not be easily opened.

In order to solve this problem, the devices have been invented which may adjust the internal pressure in order to equalize the internal pressure of airtight space to the external pressure.

However, the prior internal pressure equilibrium devices have a problem that pressure equilibrium operation may not be performed rapidly and the structure is complex so that the manufacture cost may be increased.

DETAILED DESCRIPTION OF THE INVENTION

The invention is created to solve the above described problems and so the object of the invention is to provide an internal pressure equilibrium device for airtight space wherein pressure equilibrium operation may be performed rapidly and the structure is simple so that the manufacture cost may be saved.

According to an aspect of the invention, there is provided an internal pressure equilibrium device comprising;

a pipe 8 which is mounted on the wall 9 of airtight space and has a plurality of holes 81 at the periphery, a cap 1 which seals the upper portion of the pipe B, a case 7 which surrounds the external periphery of the pipe 8 and has a plurality of holes 71 on the side wall and a first port 3 on the inner end of the case 7, a partition wall 12 provided between the case 7 and the pipe 8 to separate the holes 81 of the pipe 8 and the holes 71 of the case 7 and has a second port 5, a first ring 4 which is slidably inserted on the periphery of the pipe 8 between the partition wall 12 and the inner end of the case 7, and a second ring 6 which slidably inserted on the periphery of the pipe 8 between the partition wall 12 and the outer end of the case 7.

According to another aspect of the invention, there is provided an internal pressure equilibrium device, in which a third ring 10 is slidably inserted on the periphery of the pipe 8 between the inner end of the case 7 and the wall 9 of the airtight space.

THE PREFERRED EMBODIMENT OF THE INVENTION

Obviously, various modifications and variations of the invention are possible without departing from the principles of the invention. It is therefore to be understood that within the scope of the appended claim, the invention may be practiced otherwise than as specifically described herein.

Figure 1:
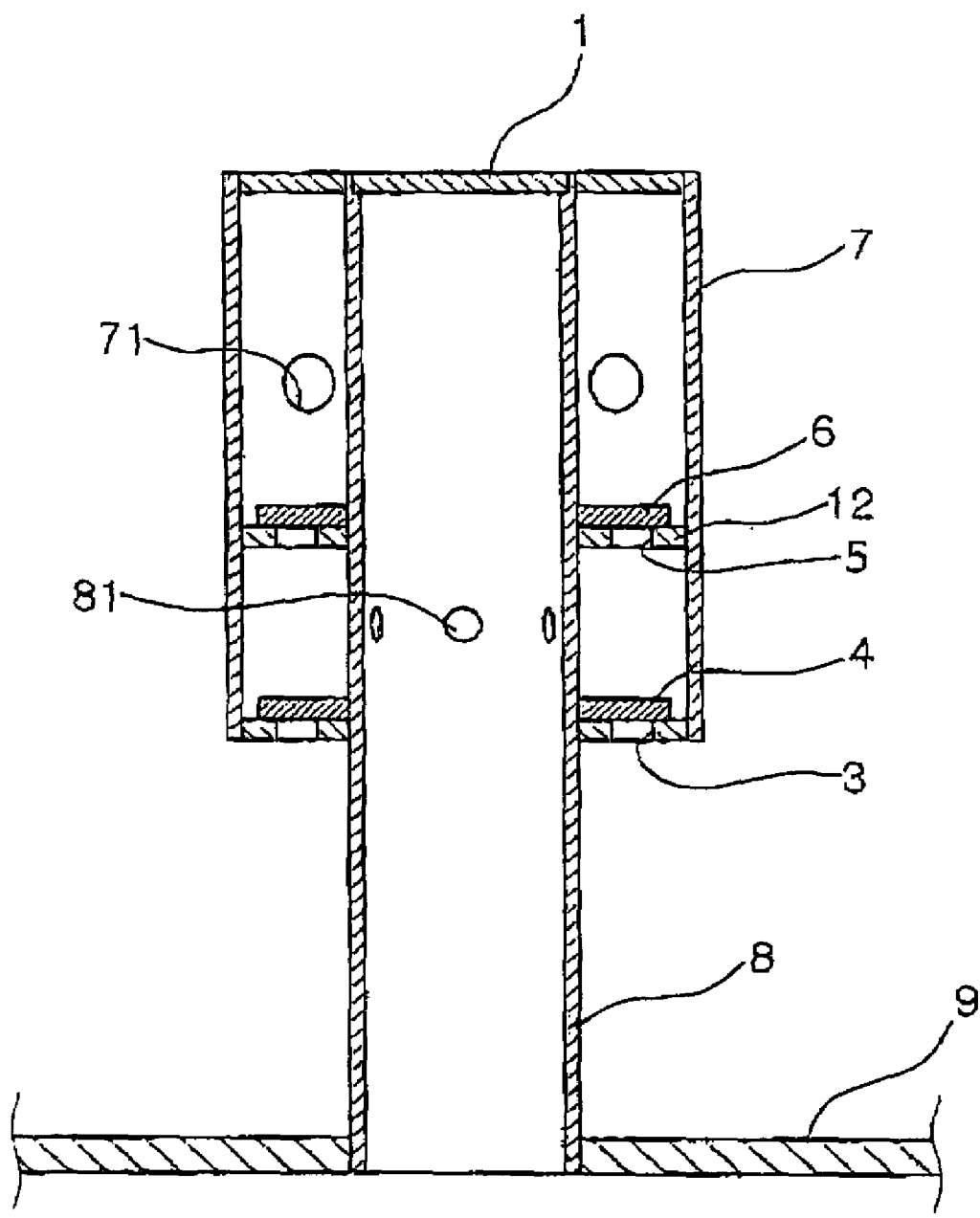
FIG. 1 shows a cross sectional view of the embodiment of the invention
Figure 2:
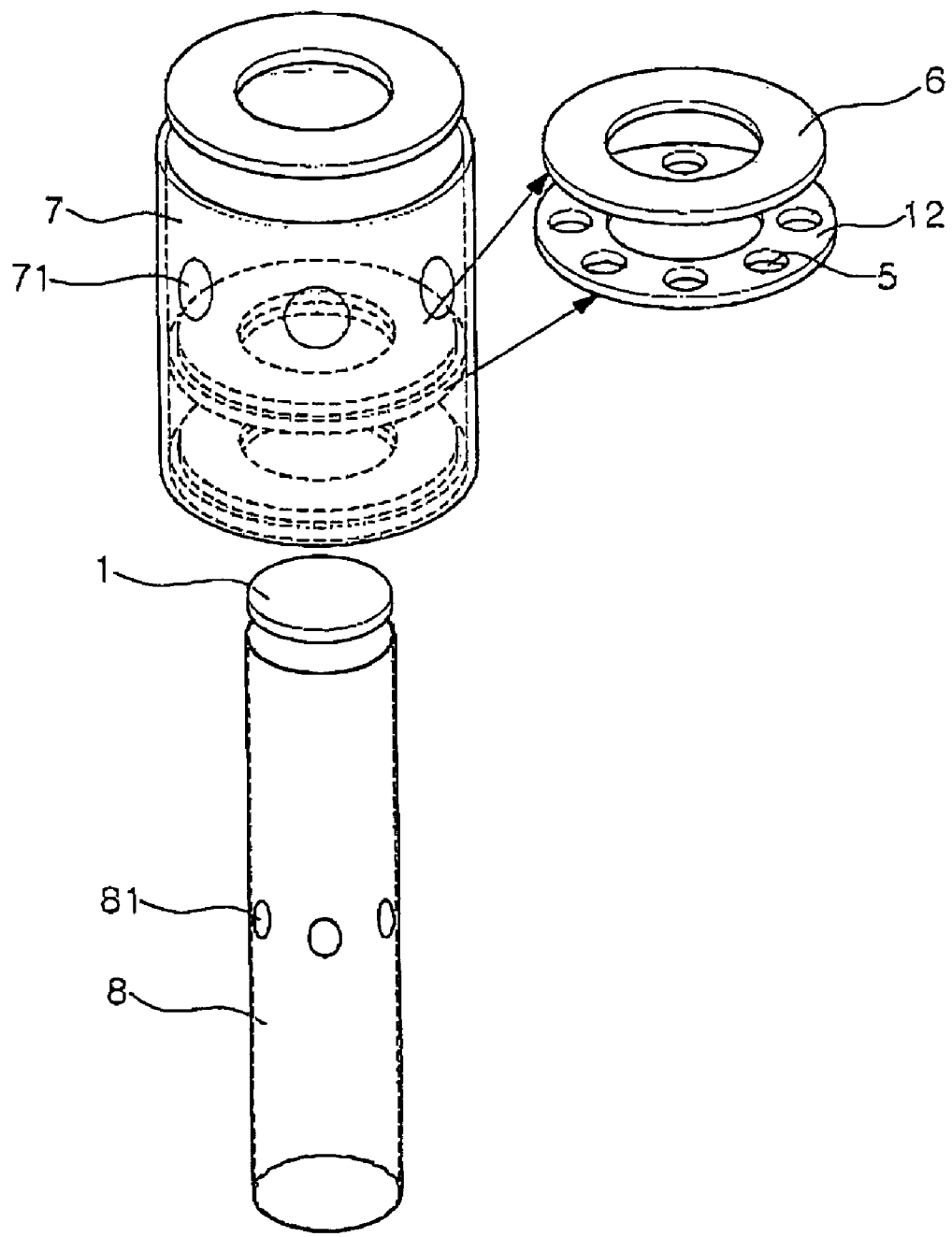
FIG. 2 shows a dissembled perspective view of the embodiment of the invention.

As shown in FIG. 1 and FIG. 2, the internal pressure equilibrium device of the invention comprises a pipe B which is mounted on the wall 9 of the refrigerator and has a plurality of holes 81 at the periphery. A cap 1 is provided to seal the upper portion of the pipe B. And a case 7 surrounds the external periphery of the pipe 8 with in order that a space may be formed between the inner wall of the case 7 and the external periphery of the pipe 8. The case 7 has a plurality of holes 71 on the side wall to connect its internal space to the external space.

A partition wall 12 is provided between the case 7 and the pipe 8, and separates the holes 81 of the pipe 8 and the holes 71 of the case 7. This partition wall 12 has a second port 5, A first port 3 is formed at the inner end of the case 7 which faces the wall 9 of the refrigerator. The external air may be streamed into the refrigerator through the first port 3. The first ring 4 is slidably inserted on the pipe 8 between the inner end of the case 7 and the partition wall 12 to open and close the first port 3. And the second ring 6 is slidably inserted on the pipe 8 between the partition wall 12 and the outer end of the case 7 to open and close the second port 5.

Hereinafter, the operation of the invention will be described in detail.

If the internal temperature of airtight space like as a refrigerator or freezing warehouse is descended, the pressure is also descended. If the internal pressure of airtight space is descended below the external pressure, without an internal pressure equilibrium device mounted on the wall 9 of airtight space, it will be difficult for a user to open the door of airtight space.

However, if an internal pressure equilibrium device is mounted on the wall 9 of airtight space, when the pressure inside the airtight space is descended below the external pressure of airtight space, the external air is streamed into airtight space of the refrigerator through the port 3 formed at the inner end of the case 5 so that the first ring 4 is lifted upwardly by the force of the external air inflowing into airtight space of the refrigerator. And, the air inflowing like this is rapidly streamed into airtight space through the hole 81 of the pipe 8 so that the internal pressure of airtight space may be ascended and equalized to the external pressure.

If the pressure inside airtight space becomes as same as that of the external space, the lifted first ring 4 is again descended by gravity and the internal portion of airtight space is sealed again.

In a way, when a user opens the door of refrigerator and closes it again, the pressure inside airtight space of the refrigerator may be rapidly ascended over the external pressure of airtight space. In this case, the internal air of airtight space may be streamed out of the airtight space through the second port 5 formed at the partition wall 12, and the second ring 6 is lifted upward by the force of the air which is streamed out of airtight space. And, the air streamed out of airtight space is rapidly drained through the hole 71 of the case 7 so that the internal pressure of airtight space may be descended again and may be momentarily equalized to the external pressure of airtight space.

If the pressure inside the airtight space becomes as same as the pressure outside airtight space, the lifted second ring 6 is descended again by gravity and the airtight space is sealed again.

Figure 3:
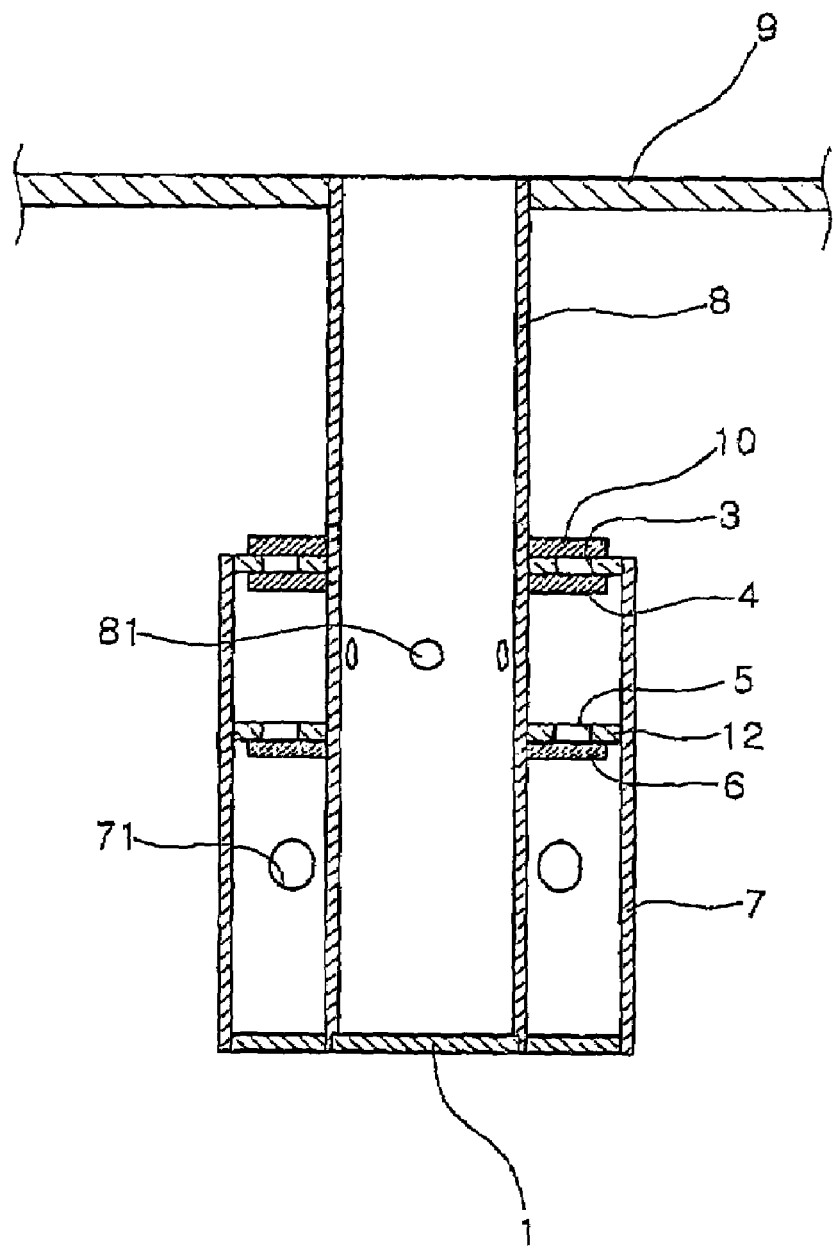
FIG. 3 is shows the embodiment attached on the bottom wall of the refrigerator

FIG. 3 shows another embodiment of the invention in which the pressure equilibrium device is attached on the bottom of the refrigerator upside down. In this embodiment, the third ring 10 is slidably inserted on the pipe 8 between the inner end of the case 7 and the bottom wall 9 of the refrigerator. In this case, the third ring 10 will open and close the first port 3 and the first ring 4 will open and close the second port 5. According to this embodiment, the invention of the pressure equilibrium device could be attached on either the roof wall or the bottom wall of the refrigerator depending on the design condition.

INDUSTRIAL APPLICABILITY

According to the above described invention, the invention has the advantage that pressure equilibrium operation may be performed rapidly and the structure is simple so that the manufacture cost may be saved.

The invention claimed is:

1. An internal pressure equilibrium device comprising:
a pipe 8 mounted on a wall 9 of an airtight space and in communication with the airtight space, the pipe having a plurality of holes 81 at a periphery of the pipe,
a cap 1 sealing an upper portion of the pipe 8 located away from the wall 9,
a case 7 surrounding an external periphery of the pipe 8 and having a plurality of holes 71 on a side wall thereof, and a first port 3 on an inner end of the case 7,
a partition wall 12 disposed between the case 7 and the pipe 8 to separate the holes 81 of the pipe 8 and the holes 71 of the case 7, the partition having second port 5,
a first ring 4 slidably inserted on an external periphery of the pipe 8 between the partition wall 12 and an outer end of the case 7, and
a second ring 6 slidably inserted on the external periphery of the pipe 8 between the partition wall 12 and an outer end of the case 7.

2. An internal pressure equilibrium device according to claim 1, including a third ring 10 slidably mounted on the external periphery of the pipe 8 between the inner end of the case 7 and the wall 9 of the airtight space.

* * * * *